United States Patent
Thoen et al.

(10) Patent No.: US 10,616,750 B2
(45) Date of Patent: Apr. 7, 2020

(54) WIRELESS COMMUNICATION DEVICE

(71) Applicant: NXP B.V., Eindhoven (NL)

(72) Inventors: Steven Mark Thoen, Blanden (BE); Pieter Verschueren, Langdorp (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/862,231

(22) Filed: Jan. 4, 2018

(65) Prior Publication Data

US 2019/0208396 A1    Jul. 4, 2019

(51) Int. Cl.
| | |
|---|---|
| H04W 8/00 | (2009.01) |
| H04L 5/00 | (2006.01) |
| H04W 48/10 | (2009.01) |
| H04W 48/16 | (2009.01) |
| H04W 48/14 | (2009.01) |
| H04W 88/06 | (2009.01) |
| H04W 16/14 | (2009.01) |

(52) U.S. Cl.
CPC .......... *H04W 8/005* (2013.01); *H04L 5/0035* (2013.01); *H04L 5/0048* (2013.01); *H04W 48/10* (2013.01); *H04W 48/14* (2013.01); *H04W 48/16* (2013.01); *H04W 88/06* (2013.01); *H04W 16/14* (2013.01)

(58) Field of Classification Search
CPC ..... H04W 48/10; H04W 48/14; H04W 48/16; H04W 52/028; H04W 4/80; H04W 88/10; H04W 12/06; H04L 5/0035; H04L 5/0048; H04B 15/02
See application file for complete search history.

(56) References Cited

U.S. PATENT DOCUMENTS

| | | | |
|---|---|---|---|
| 2003/0100274 A1 | 5/2003 | Brown | |
| 2013/0196598 A1* | 8/2013 | McCormack | .......... H04B 15/02 455/41.1 |
| 2016/0072804 A1* | 3/2016 | Chien | .................. H04W 12/06 726/4 |
| 2016/0345096 A1 | 11/2016 | Lott | |
| 2017/0063134 A1* | 3/2017 | Sultenfuss | ............. H02J 50/00 |
| 2017/0295420 A1 | 10/2017 | Yeung et al. | |

FOREIGN PATENT DOCUMENTS

| | | |
|---|---|---|
| CN | 203180922 U | 9/2013 |
| WO | WO-2008/113053 A1 | 9/2008 |
| WO | WO-2012/021879 A2 | 2/2012 |
| WO | WO-2012/021879 A3 | 2/2012 |
| WO | WO-2017/100821 A1 | 6/2017 |

OTHER PUBLICATIONS

NXP; "MiGLO NFMI radios for truly wireless audio and data streaming"; Product Brochure 2 pages (2016)

* cited by examiner

Primary Examiner — Thanh C Le (57) ABSTRACT

One example discloses a first wireless device, including: a wireless device presence detection module configured to, generate a second wireless device presence signal if a second wireless device is within a preselected range; and generate a third wireless device presence signal if a third wireless device is within the preselected range; and a communications control module, configured to, enable communication between the first and second wireless devices in response to the second device presence signal; and disable communication between the first and third wireless devices in response to the third device presence signal.

24 Claims, 7 Drawing Sheets

WIRELESS COMMUNICATION DEVICE

The present specification relates to systems, methods, apparatuses, devices, articles of manufacture and instructions for wireless communication.

SUMMARY

According to an example embodiment, a first wireless device, comprising: a wireless device presence detection module configured to, generate a second wireless device presence signal if a second wireless device is within a preselected range; and generate a third wireless device presence signal if a third wireless device is within the preselected range; and a communications control module, configured to, enable communication between the first and second wireless devices in response to the second device presence signal; and disable communication between the first and third wireless devices in response to the third device presence signal.

In another example embodiment, further comprising a near-field transceiver configured to limit the preselected range.

In another example embodiment, the first device is configured to communicate using an antenna pattern having an amplified portion and an attenuated portion; and the amplified portion is aligned toward the second wireless device and the attenuated portion is aligned toward the third wireless device.

In another example embodiment, the first wireless device includes an antenna having a solenoid shape.

In another example embodiment, further comprising a shielding structure configured to limit the preselected range.

In another example embodiment, the shielding structure is configured to attenuate communication signals between the first and third wireless devices.

In another example embodiment, the first wireless device is configured to communicate with the second wireless devices at a first frequency; and the third wireless device is configured to communicate with a fourth wireless device at a second frequency.

In another example embodiment, the first and second wireless devices are configured to be coupled to a first user station; and the third wireless device and a fourth wireless device are configured to be coupled to a second user station.

In another example embodiment, the user stations are embedded within at least one of: an airplane cabin, a theater, a classroom, a hotel lobby, an auditorium, a library, a call-center or a set of office cubicles.

In another example embodiment, further comprising an object presence detection module configured to, generate an object present signal in response to an object coupled to either the first or second wireless device.

In another example embodiment, the object is at least one of: a user, a person, a seat, a desk, a building, or a vehicle.

In another example embodiment, the communications control module, configured to, enable communication between the first and second wireless devices in response to both the second device presence signal and the object present signal; and disable communication between the first and second wireless devices if the object present signal is absent.

In another example embodiment, further comprising a media processing module; wherein the communications control module, configured to, command the media processing module to play in response to both the second device presence signal and the object present signal; and command the media processing module to pause if the object present signal is absent.

In another example embodiment, further comprising a media processing module; wherein the communications control module, configured to, command the media processing module to receive audio in response to both the second device presence signal and the object present signal; and command the media processing module to mute if the object present signal is absent.

In another example embodiment, further comprising a media processing module; wherein the communications control module, configured to, command the first wireless device to unlock in response to both the second device presence signal and the object present signal; and command the first wireless device to lock if the object present signal is absent.

In another example embodiment, further comprising a media processing module; wherein the communications control module, configured to, command the first wireless device to pair with the second wireless device in response to both the second device presence signal and the object present signal; and command the first wireless device to not pair with the second wireless device if the object present signal is absent.

In another example embodiment, further comprising a presence sensor coupled to the object presence detection module; wherein the object presence detection module is configured to generate the object present signal in response to the presence sensor receiving from the object at least one of: an optical image, an infra-red image, a radar reflection, a pressure signal, a contact signals, a proximity signal, or a gesture signal.

In another example embodiment, the object presence detection module is configured to generate the object present signal in response to the transceiver receiving from the second wireless device at least one of: a predetermined signal strength, a RFID signal, or an NFC signal.

According to an example embodiment, an article of manufacture including at least one non-transitory, tangible machine readable storage medium containing executable machine instructions for wireless communication, comprising: wherein the article includes a first wireless device, a wireless device presence detection module, and a communications control module; wherein the instructions include, generate a second wireless device presence signal if a second wireless device is within a preselected range; generate a third wireless device presence signal if a third wireless device is within the preselected range; enable communication between the first and second wireless devices in response to the second device presence signal; and disable communication between the first and third wireless devices in response to the third device presence signal.

According to an example embodiment, a method for enabling a first wireless device to be operated, comprising: distributing a set of instructions, stored on a non-transitory, tangible computer readable storage medium, for configuring the first wireless device; wherein the first wireless device includes a wireless device presence detection module and a communications control module; and wherein the instructions include, generate a second wireless device presence signal if a second wireless device is within a preselected range; generate a third wireless device presence signal if a third wireless device is within the preselected range; enable communication between the first and second wireless devices in response to the second device presence signal;

and disable communication between the first and third wireless devices in response to the third device presence signal.

In another example embodiment, further comprising a media processing module; wherein the communications control module, configured to, command the media processing module to play in response to the second device presence signal; and command the media processing module to pause if the second device presence signal is absent.

In another example embodiment, further comprising a media processing module; wherein the communications control module, configured to, command the media processing module to receive audio in response to the second device presence signal; and command the media processing module to mute if the second device presence signal is absent.

In another example embodiment, further comprising a media processing module; wherein the communications control module, configured to, command the first wireless device to unlock in response to the second device presence signal; and command the first wireless device to lock if the second device presence signal is absent.

In another example embodiment, further comprising a media processing module; wherein the communications control module, configured to, command the first wireless device to pair with the second wireless device in response to the second device presence signal; and command the first wireless device to not pair with the second wireless device if the second device presence signal is absent.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Communication with and/or between a pair of specific devices in a confined geometric space can be challenging. For example, multiple separate media transmissions between pairs of devices in an airplane cabin use a physical wire connection between the pair of devices (e.g. an entertainment media player in a back of an airline seat and a passenger's wired headset) to ensure exclusivity of communications.

Switching such headphones to wireless to increase an airline passenger's comfort level using far-field technologies such as Bluetooth, wireless and/or cellular signals, however, may result in an unacceptable interference either with other passengers and/or other electronic devices and thus be prohibited.

Also, RF signals in an enclosed space such as an airplane must be absorbed by something, like human tissue as characterized by its Specific absorption rate (SAR). SAR is a measure of the rate at which energy is absorbed by the human body when exposed to a radio frequency (RF) electromagnetic field. Thus too many far-field RF devices in such a space means a greater exposure to radiation.

For example, in some applications RF interference generated by multiple close-proximity far-field signals would be high (e.g. wireless signals in an airplane cabin interfering with the airplane's avionics, communications or other systems).

In addition, due to a proximity of many other passengers, RF systems such as Bluetooth could break down due to an elevated level of mutual interference (e.g. Bluetooth Classic has only 80 channels, but has a range of 10-15 meters). Bluetooth devices could conflict with more than 80 users in various crowded spaces such as an airplane, theater, classroom, hotel lobby, auditorium, call-center, office cubicles, etc.

Even with less than 80 users, degradation may occur as the channels are not guaranteed to be used in mutually exclusive timeslots as the various Bluetooth systems (=transmitter+receiver) are not time synchronized and will randomly overlap in time on the same channel and will disturb each other.

As a result, media (e.g. audio, video, etc.) connection interference and/or lost connections will result in a bad user experience.

Figure 1:
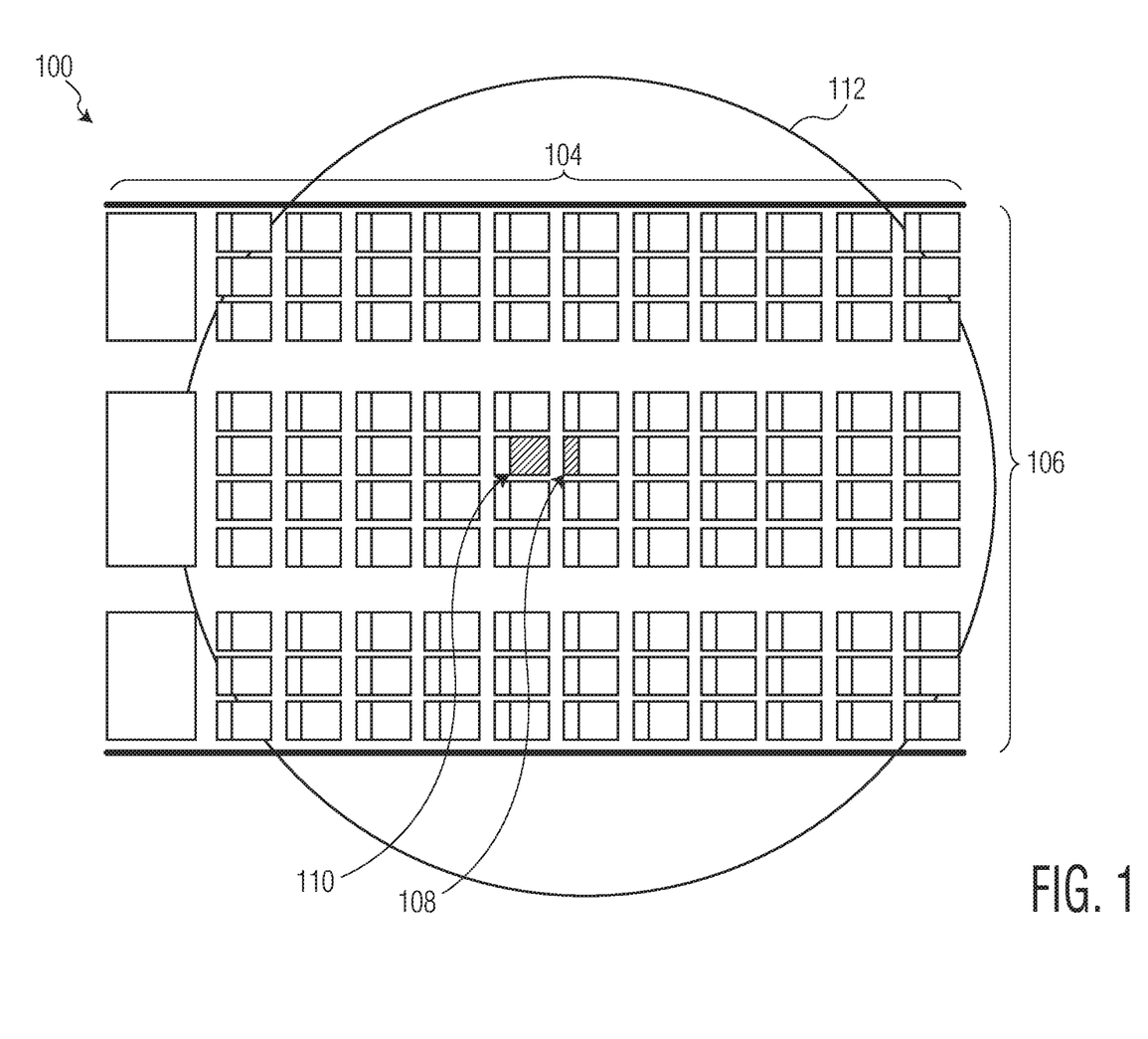
FIG. 1 is a first example of an array of wireless communications devices.

FIG. 1 is a first example 100 of an array of wireless communications devices. In the first example 100 the array of wireless communications devices (e.g. in an airplane cabin, theater, classroom, etc.) are arranged into rows 104 and columns 106.

Shown is a first wireless device 108 (e.g. integrated into an airplane seatback) and a second wireless device 110 (e.g. embedded in a user headset). Due to their relatively close proximity, these devices 108, 110 have a similar communications device signal range 112 (e.g. using far-field communications Bluetooth Classic signal using an omnidirectional 2.4 GHz antenna).

Thus in for example an airplane cabin, the far-field signals between wireless devices in seatbacks and wireless devices in passenger headsets, all sitting closely together, substantially overlap, thereby interfering with not only other passenger communications but perhaps also the airplane communications and other systems mentioned.

Figure 2:
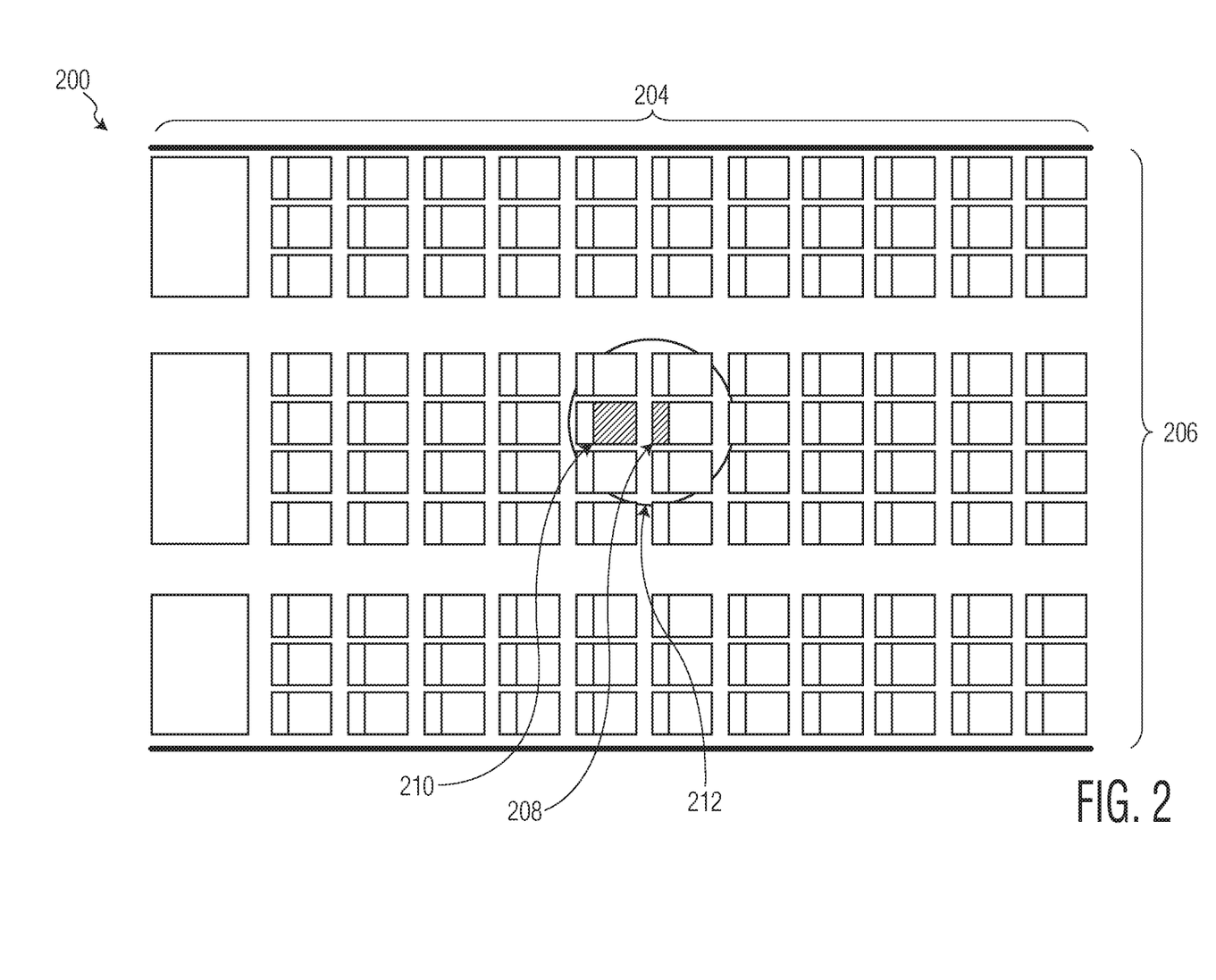
FIG. 2 is a second example of an array of wireless communications devices.

FIG. 2 is a second example 200 of an array of wireless communications devices. In the second example 200 the array of wireless communications devices are also arranged in rows 204 and columns 206.

Similarly shown, a first wireless device 208 (e.g. integrated into a seatback) and a second wireless device 210 (e.g. embedded in a user headset). In this example however a wireless device signal range 212 of the devices 208, 210 is substantially smaller.

This is because in the second example 200, the wireless devices 208, 210 use near-field communications (e.g. NFMI—Near-Field Magnetic Induction). Using near-field signals a transmit/receive signal range for the wireless devices 208, 210 can be precisely tuned and shaped to cover just a specific area (e.g. an area between the airplane seatback and user headset).

Antenna size and pattern at either or both the transmitter and receiver side as well as the transmit power and/or receive sensitivity can be adjusted. Tight control over the signal range reduces an overall number of potentially interfering wireless devices and increases a robustness of the overall communications system with the array of devices. Thus, an amount of interference between neighboring pairs of wireless devices is substantially reduced.

Figure 3:
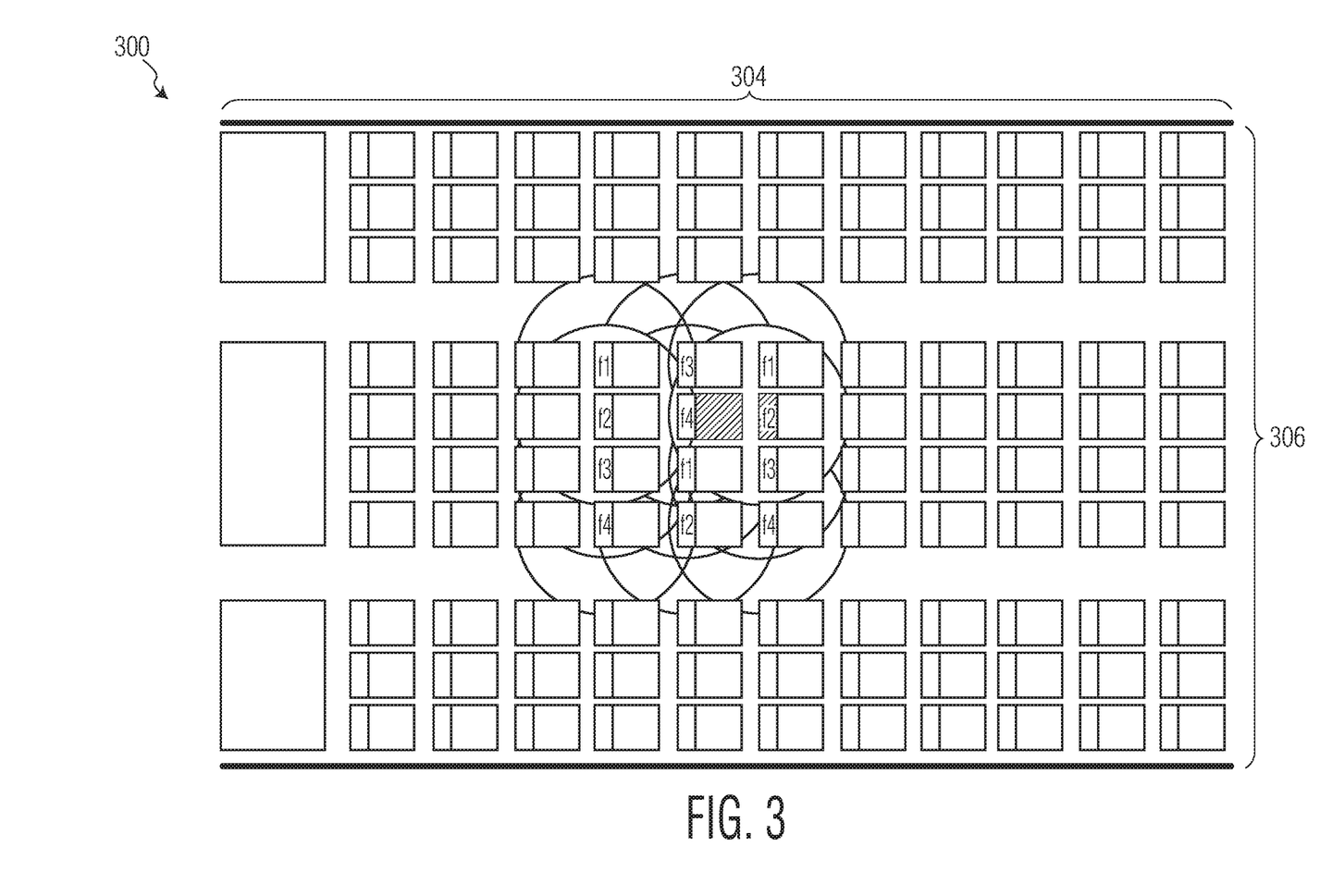
FIG. 3 is a third example of an array of wireless communications devices.

FIG. 3 is a third example 300 of an array of wireless communications devices. In the third example 300 the array of wireless communications devices arranged into rows 304 and columns 306 includes a set of near-field wireless devices having a set of near-field wireless device signal ranges, as shown, however each pair of wireless devices (e.g. in a seatback and user headset) uses a different communications frequency/channel.

Interference between neighboring wireless devices is further reduced using the different carrier frequencies between a set of nearest neighboring (e.g. adjacent) pairs of wireless devices in the array. In this frequency reuse example, carrier frequencies f1, f2, f3 and f4 are used as shown in FIG. 3.

Figure 4:
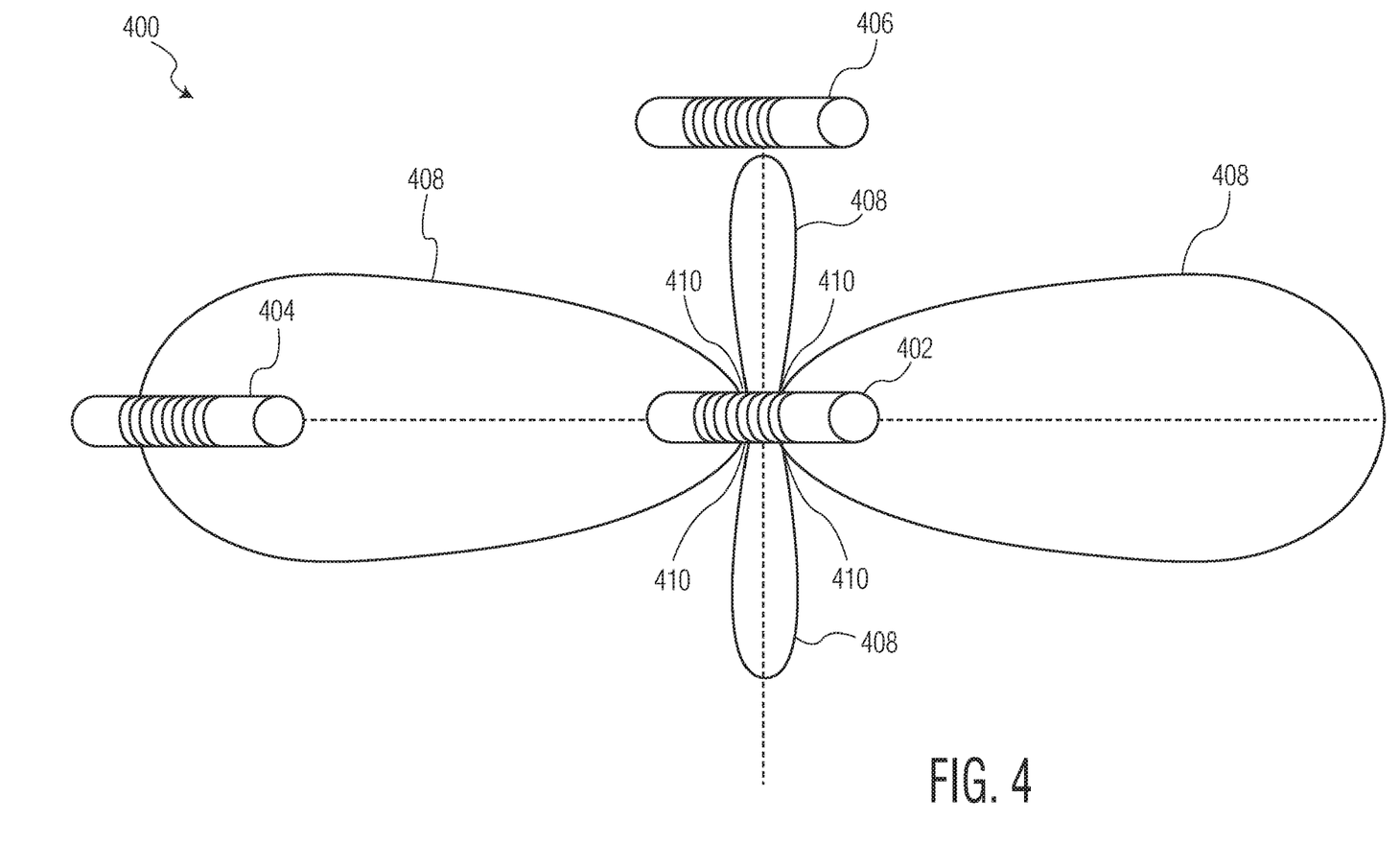
FIG. 4 is a fourth example of an array of wireless communications devices.

FIG. 4 is a fourth example 400 of an array of wireless communications devices. The fourth example 400 shows a first wireless device 402, a second wireless device 404, and a third wireless device 406. The first wireless device 402 has a representative antenna pattern 408 with at least four lobes (e.g. two stronger and two weaker). The antenna pattern 408 also has a set of nulls 410 at 45, 135, 225 and 315 degrees.

In example 400, the wireless devices 402, 404, 406 communicate using near-field solenoid coil antennas. The antenna pattern 408 for the solenoid antenna is not circular and instead contains multiple lobes of varying strength as well as null over various angles.

In some example embodiments, this lobe and null directionality is further used to reduce interference between neighboring first and third wireless devices 402, 406. Further, in this example 400, antenna pattern strength is minimized at the 45, 135, 225 and 315 degree nulls 410. Applied to the airplane use case, interference between diagonally neighboring seats is minimized by these nulls 410. Additional techniques for further shaping the wireless device's antenna patterns can also be used.

Figure 5:
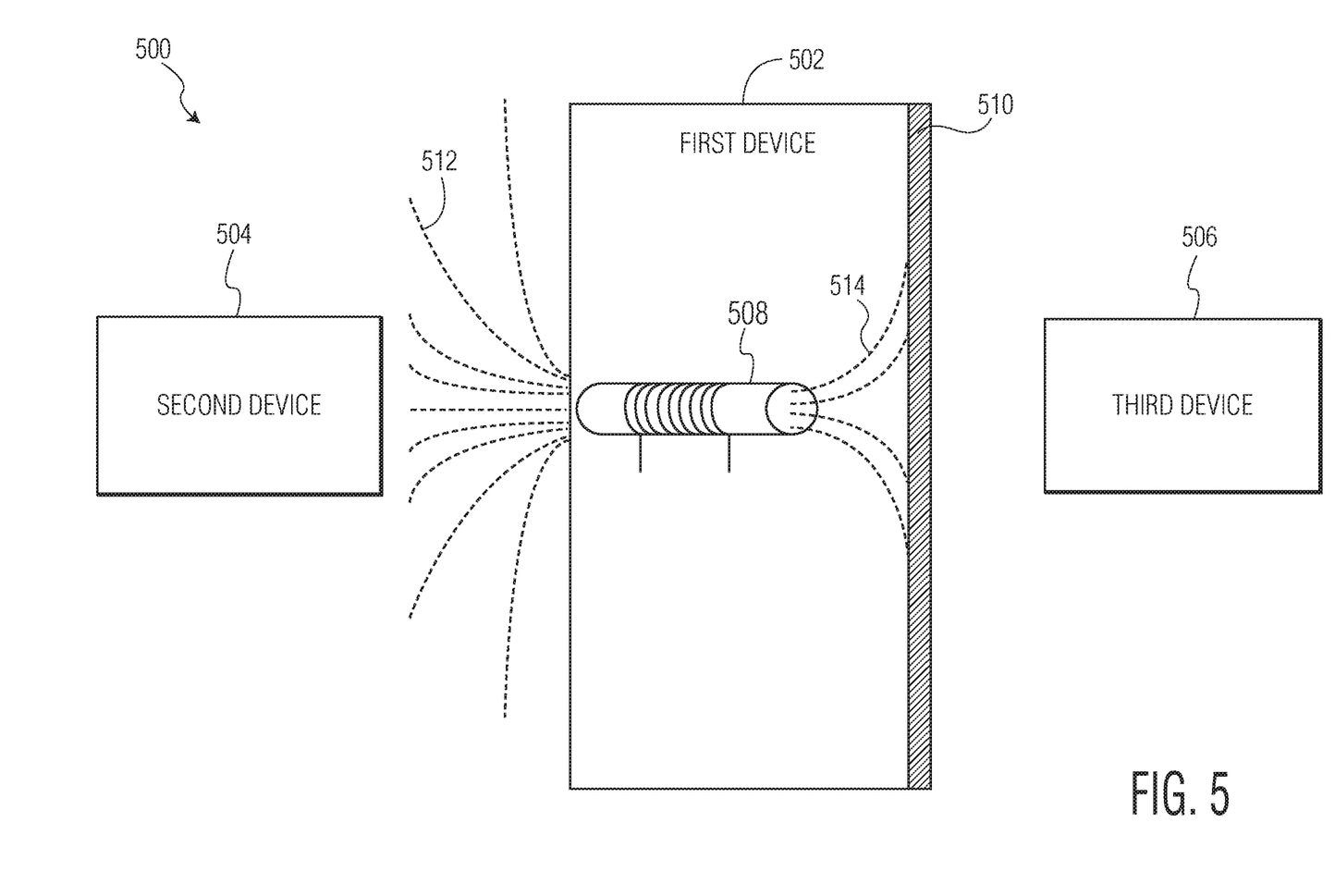
FIG. 5 is a fifth example of an array of wireless communications devices.

FIG. 5 is a fifth example 500 of an array of wireless communications devices. The fifth example 500 includes a first wireless device 502 (e.g. transmitter), a second wireless device 504 (e.g. a first intended receiver) and a third wireless device 506 (e.g. a second unintended receiver).

The first wireless device 502 (e.g. transmitter) includes an antenna coil 508 and a signal attenuation device 510 (e.g. passive shield or active electronic attenuator). The antenna coil 508 generates a desired antenna pattern 512 and an undesired antenna pattern 514. The signal attenuation device 510 helps block the undesired antenna pattern 514 from enabling communication with the third wireless device 506 (e.g. a second unintended receiver).

The signal attenuation device 510 in one example embodiment is a magnetic shielding sheet placed between the antenna coil 508 and the third wireless device 506 to disable communication with and reduce interference from the third wireless device 506 in a different row of seats, using the airplane cabin use case example again.

Figure 6:
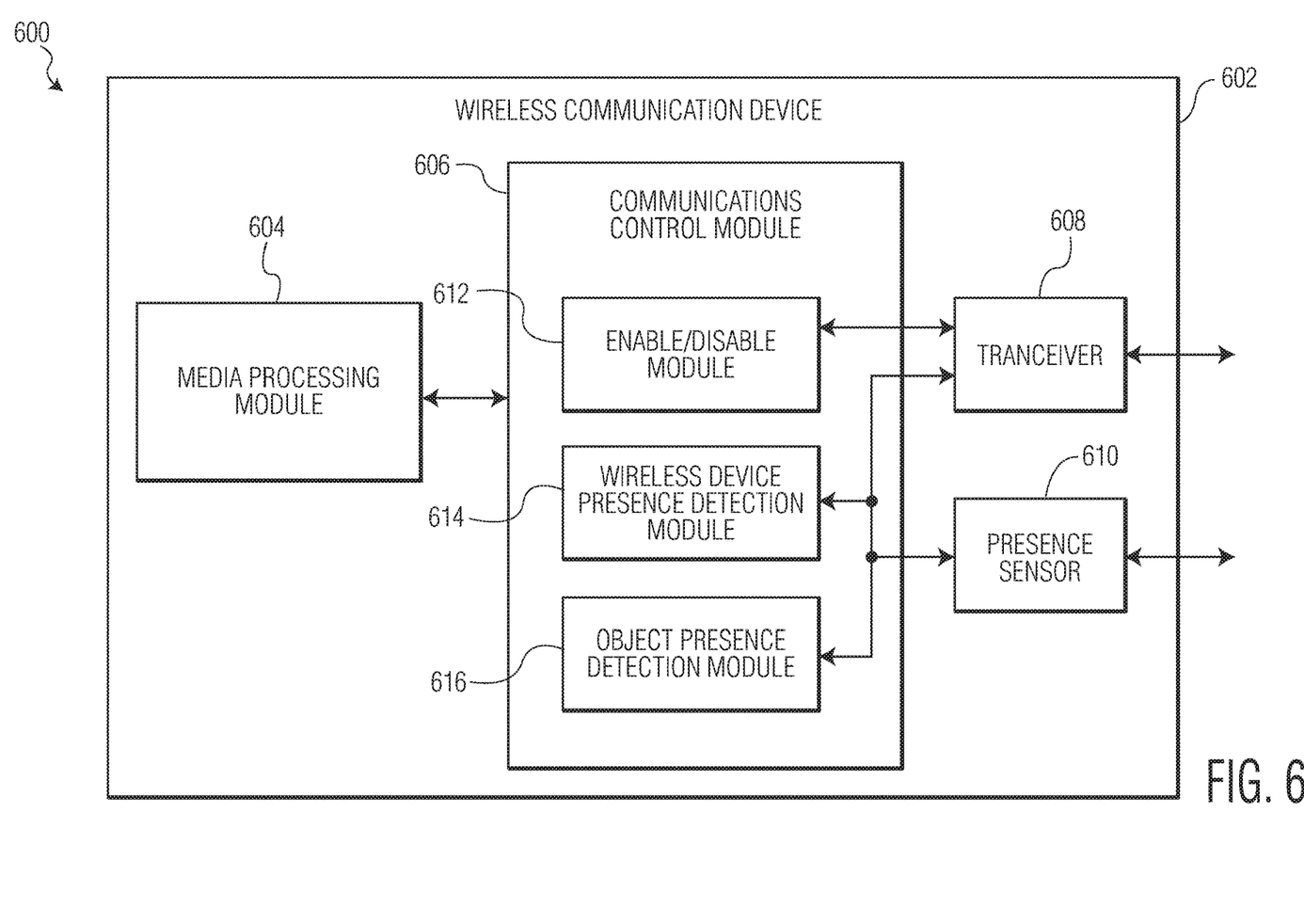
FIG. 6 is an example wireless communication device.

FIG. 6 is an example 600 wireless communication device 602. The wireless communication device 602 includes a media processing module 604, a communications control module 606, a transceiver 608, and a presence sensor 610. The communications control module 606 includes an enable/disable module 612, a wireless device presence detection module 614, and an object presence detection module 616.

The wireless device presence detection module 614 is configured to, generate a second wireless device presence signal if a second wireless device (e.g. FIG. 4, 404) is within a preselected range, and generate a third wireless device presence signal if a third wireless device (e.g. FIG. 4, 406) is within the preselected range.

The communications control module 606 is configured to, enable communication between the wireless device 602 and the second wireless device in response to the second device presence signal, and disable communication between the wireless device 602 and the third wireless device in response to the third device presence signal.

In some example embodiments, the wireless devices are configured to be coupled to various user stations, which can be embedded within: an airplane cabin, a theater, a classroom, a hotel lobby, an auditorium, a library, a call-center or a set of office cubicles. The wireless devices can also be embedded within a wireless headset, an earbud, a wearable device, or a smartphone.

The object presence detection module 616 is configured to, generate an object present signal in response to an object coupled to either the first or second wireless device. The object in various example embodiments can be: a user, a person, a seat, a desk, a building, or a vehicle.

In one example, the communications control module 606 is configured to, enable communication between the first and second wireless devices in response to both the second device presence signal and the object present signal, and disable communication between the first and second wireless devices if the object present signal is absent.

In example embodiments which further include the media processing module 604, the communications control module 606 can be configured to, command the media processing module to play in response to both the second device presence signal and the object present signal, and command the media processing module to pause if the object present signal is absent.

In other example embodiments, the communications control module 606 can be configured to, command the media processing module to receive audio in response to both the second device presence signal and the object present signal, and command the media processing module to mute if the object present signal is absent.

In still other example embodiments, the communications control module 606 can be configured to, command the first wireless device to unlock in response to both the second device presence signal and the object present signal, and command the first wireless device to lock if the object present signal is absent.

Also in other example embodiments, the communications control module 606 can be configured to, command the first wireless device to pair with the second wireless device in response to both the second device presence signal and the object present signal, and command the first wireless device to not pair with the second wireless device if the object present signal is absent.

In example embodiments where the wireless communication device 602 includes a presence sensor 610 coupled to the object presence detection module 616, the object presence detection module is configured to generate the object present signal in response to the presence sensor receiving from the object at least one of: an optical image, an infra-red image, a radar reflection, a pressure signal, a contact signals, a proximity signal, or a gesture signal.

Alternatively, the object presence detection module 616 can be configured to generate the object present signal in response to the transceiver 608 receiving from the second wireless device at least one of: a predetermined signal strength, a RFID signal, or an NFC signal.

Thus, using the wireless device presence detection module 614, the object presence detection module 616, and/or the presence sensor 610, proximity based communications, pairing, lock/unlock, play/pause and other automatic functions can be enabled between two or more wireless devices.

Presence/proximity can functionality can be based on: received signal strength indication (RSSI), close-range operation of NFMI, instructing a headset user to bring the headset close to the seatback initially, including a RFID or NFC tag/reader in the wireless devices, radar reflections, face recognition or other camera images, or a user's posture or eye movements (e.g. awake or asleep).

Auto-play/pause, lock/unlock, etc. enables communications between wireless devices to be paused/stopped when either a headset and/or a user wearing the headset is out of range, even if the wireless device in the headset remains close to the wireless device in the seatback. Audio/video playback can then auto-resume when user either returns and/or places the headset back on their head.

The instructions discussed above can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments, the set of instructions described above are implemented as functional and software instructions. In other embodiments, the instructions can be implemented either using logic gates, application specific chips, firmware, as well as other hardware forms.

Figure 7:
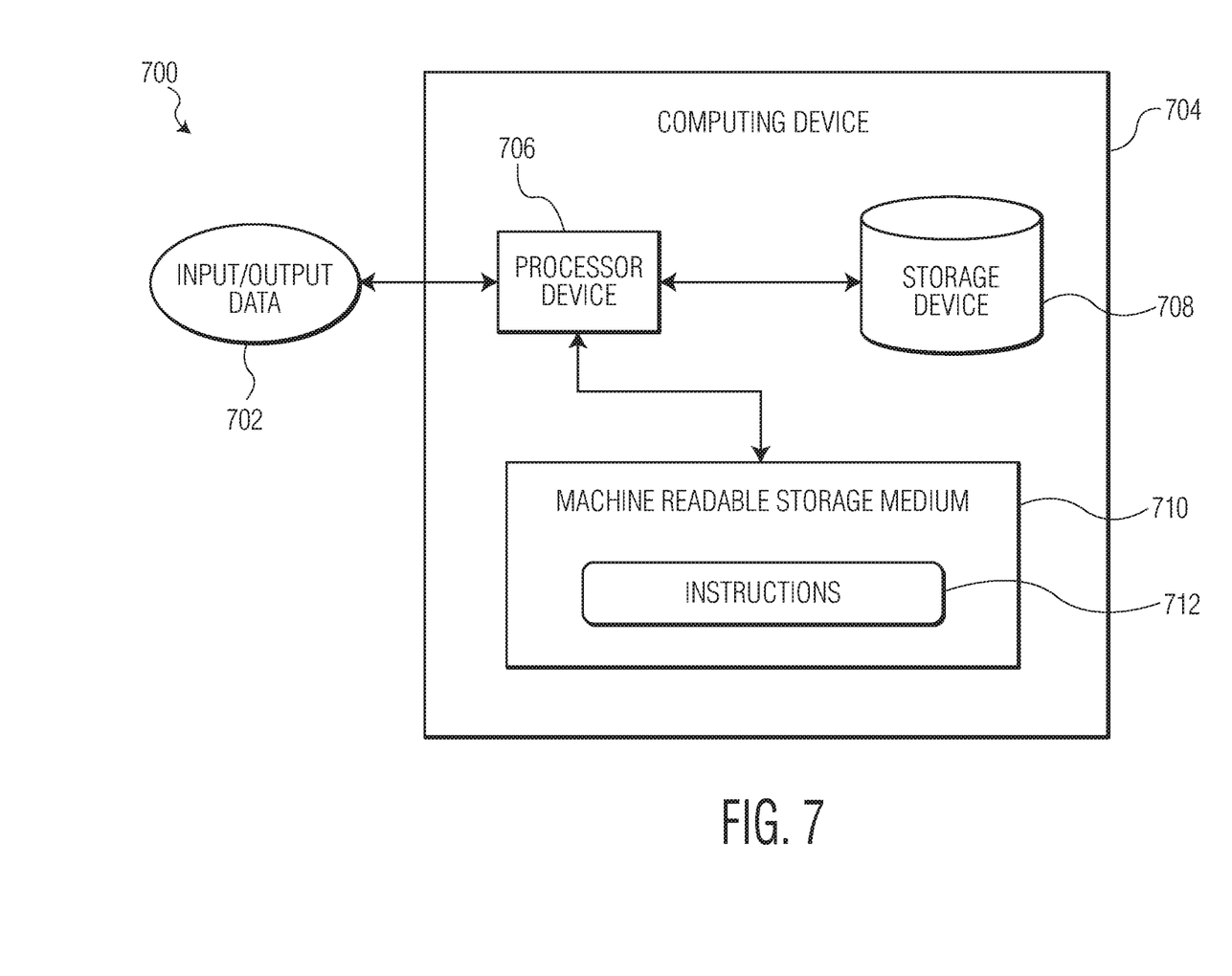
FIG. 7 is an example system for hosting instructions for enabling the wireless communication device.

FIG. 7 is an example system for hosting instructions for enabling the wireless communication device. The system 700 shows an input/output data 702 interface with an electronic apparatus 704. The electronic apparatus 704 includes a processor 706, a storage device 708, and a non-transient machine-readable storage medium 710. The machine-readable storage medium 710 includes instructions 712 which control how the processor 706 receives input data 702 and transforms the input data into output data 702, using data within the storage device 708. Example instructions 712 stored in the machine-readable storage medium 710 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

Additional Advantages of using near-field (e.g. NFMI, NFEMI, NFC, etc.) signals in various example embodiments include:

a. Ultra-low power: NFMI audio transmission and reception only requires ~3 mW of power consumption which is substantially lower than Bluetooth Classic solutions which today typically require 50-60 mW of power.

b. Using NFMI a high-quality stereo stream can be received, requiring only ~5 mW of power consumption which is a factor 10 lower than a typical Bluetooth headphone. This implies that the battery lifetime of a wireless headphone will be drastically improved.

c. This means that a headset does not need to be recharged during the duration of a long flight (e.g. airplane use case example), which significantly reduces the burden on both crew and maintenance personnel to ensure that all headphones are operational throughout the flight.

d. Additionally, it does not require the passenger to recharge the headphones himself during the flight, potentially removing the need to add a charging station to each seat.

e. Potentially the headphones can be recharged using wireless charging, in which case it is possible to reuse the NFMI coil for wireless charging. Adding wireless charging again simplifies the maintenance problem for crew and/or maintenance personnel.

f. Additionally, NFMI can be used for close-range communications in situations where the number of devices is limited. This includes:

i. Gaming headsets: gamers typically sit close to their screen so NFMI provides a good technology for audio transport.

ii. PC headsets: similarly, when working on a PC or laptop, users are in close proximity to their screen and NFMI can be used for audio transport.

iii. Direct conversation between persons in noisy situations (e.g. firefighters, construction workers, airport ground handlers, motorcyclists): by wearing headsets and coming close, they can have a natural conversation using NFMI, whereby the noise is removed by capturing and processing the microphone signals at the first person's headset and playing them back in the other person's headset.

Additionally:

a. In some example embodiments, the wireless devices can be mobile, such as those carried by various people who first come in close proximity to pair their wireless devices and then disperse but continue their conversation.

b. Robust communication is supported despite close co-location of multiple users due to the close range and antenna pattern shaping capabilities of NFMI.

c. Localized, intuitive communication is enabled since a wireless communication channel is automatically established once the user comes in range without the need for any formal pairing or manual set up.

d. Automatic pairing is possible since the cumbersome process of Bluetooth pairing can be completely avoided by using NFMI and proximity pairing. By coming close to the other device, communication will automatically be established without user intervention.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first wireless device, comprising:
   a wireless device presence detection module configured to,
      generate a second wireless device presence signal if a second wireless device is within a preselected range; and
      generate a third wireless device presence signal if a third wireless device is within the preselected range; and
   a communications control module, configured to,
      enable communication between the first and second wireless devices in response to the second device presence signal; and
      disable communication between the first and third wireless devices in response to the third device presence signal.

2. The device of claim 1:
   further comprising a near-field transceiver configured to limit the preselected range.

3. The device of claim 1:
   wherein the first device is configured to communicate using an antenna pattern having an amplified portion and an attenuated portion; and
   wherein the amplified portion is aligned toward the second wireless device and the attenuated portion is aligned toward the third wireless device.

4. The device of claim 1:
   wherein the first wireless device includes an antenna having a solenoid shape.

5. The device of claim 1:
   further comprising a shielding structure configured to limit the preselected range.

6. The device of claim 5:
   wherein the shielding structure is configured to attenuate communication signals between the first and third wireless devices.

7. The device of claim 1:
   wherein the first wireless device is configured to communicate with the second wireless devices at a first frequency; and
   wherein the third wireless device is configured to communicate with a fourth wireless device at a second frequency.

8. The device of claim 1:
   wherein the first and second wireless devices are configured to be coupled to a first user station; and
   wherein the third wireless device and a fourth wireless device are configured to be coupled to a second user station.

9. The device of claim 8:
   wherein the user stations are embedded within at least one of: an airplane cabin, a theater, a classroom, a hotel lobby, an auditorium, a library, a call-center or a set of office cubicles.

10. The device of claim 1, further comprising:
    an object presence detection module configured to, generate an object present signal in response to an object coupled to either the first or second wireless device.

11. The device of claim 10:
    wherein the object is at least one of: a user, a person, a seat, a desk, a building, or a vehicle.

12. The device of claim 10:
    wherein the communications control module, configured to,
       enable communication between the first and second wireless devices in response to both the second device presence signal and the object present signal; and
       disable communication between the first and second wireless devices if the object present signal is absent.

13. The device of claim 10:
    further comprising a media processing module;
    wherein the communications control module, configured to,
       command the media processing module to play in response to both the second device presence signal and the object present signal; and
       command the media processing module to pause if the object present signal is absent.

14. The device of claim 10:
    further comprising a media processing module;
    wherein the communications control module, configured to,
       command the media processing module to receive audio in response to both the second device presence signal and the object present signal; and command the media processing module to mute if the object present signal is absent.

15. The device of claim 10:
further comprising a media processing module;
wherein the communications control module, configured to,
command the first wireless device to unlock in response to both the second device presence signal and the object present signal; and
command the first wireless device to lock if the object present signal is absent.

16. The device of claim 10:
further comprising a media processing module;
wherein the communications control module, configured to,
command the first wireless device to pair with the second wireless device in response to both the second device presence signal and the object present signal; and
command the first wireless device to not pair with the second wireless device if the object present signal is absent.

17. The device of claim 10:
further comprising a presence sensor coupled to the object presence detection module;
wherein the object presence detection module is configured to generate the object present signal in response to the presence sensor receiving from the object at least one of: an optical image, an infra-red image, a radar reflection, a pressure signal, a contact signals, a proximity signal, or a gesture signal.

18. The device of claim 10:
wherein the object presence detection module is configured to generate the object present signal in response to the transceiver receiving from the second wireless device at least one of: a predetermined signal strength, a RFID signal, or an NFC signal.

19. The device of claim 1:
further comprising a media processing module;
wherein the communications control module, configured to,
command the media processing module to play in response to the second device presence signal; and
command the media processing module to pause if the second device presence signal is absent.

20. The device of claim 1:
further comprising a media processing module;
wherein the communications control module, configured to,
command the media processing module to receive audio in response to the second device presence signal; and
command the media processing module to mute if the second device presence signal is absent.

21. The device of claim 1:
further comprising a media processing module;
wherein the communications control module, configured to,
command the first wireless device to unlock in response to the second device presence signal; and
command the first wireless device to lock if the second device presence signal is absent.

22. The device of claim 1:
further comprising a media processing module;
wherein the communications control module, configured to,
command the first wireless device to pair with the second wireless device in response to the second device presence signal; and
command the first wireless device to not pair with the second wireless device if the second device presence signal is absent.

23. An article of manufacture including at least one non-transitory, tangible machine readable storage medium containing executable machine instructions for wireless communication, comprising:
wherein the article includes a first wireless device, a wireless device presence detection module, and a communications control module;
wherein the instructions include,
generate a second wireless device presence signal if a second wireless device is within a preselected range;
generate a third wireless device presence signal if a third wireless device is within the preselected range;
enable communication between the first and second wireless devices in response to the second device presence signal; and
disable communication between the first and third wireless devices in response to the third device presence signal.

24. Method for enabling a first wireless device to be operated, comprising:
distributing a set of instructions, stored on a non-transitory, tangible computer readable storage medium, for configuring the first wireless device;
wherein the first wireless device includes a wireless device presence detection module and a communications control module; and
wherein the instructions include,
generate a second wireless device presence signal if a second wireless device is within a preselected range;
generate a third wireless device presence signal if a third wireless device is within the preselected range;
enable communication between the first and second wireless devices in response to the second device presence signal; and
disable communication between the first and third wireless devices in response to the third device presence signal.

* * * * *